C. H. MATCHETT.
Saw-Filing Devices.

No. 154,558.

Patented Sept. 1, 1874.

Witnesses.
A. Augustine Adams
H. S. Talbot

Inventor:
Charles H. Matchett
Per Sylvenus Walker
Atty.

UNITED STATES PATENT OFFICE.

CHARLES H. MATCHETT, OF SOMERVILLE, MASSACHUSETTS.

IMPROVEMENT IN SAW-FILING DEVICES.

Specification forming part of Letters Patent No. 154,558, dated September 1, 1874; application filed June 17, 1874.

*To all whom it may concern:*

Be it known that I, CHARLES H. MATCHETT, of Somerville, in the county of Middlesex and State of Massachusetts, have invented certain new and useful Improvements in Saw-Filing Guides, of which the following is a specification:

The object of my invention is to provide a cheap, simple, and convenient means for guiding a file in sharpening the teeth of hand or other similar straight saws; and it consists of a handle for receiving the shank of the file in the usual manner, to the ferrule of which is attached an outer adjustable ring, provided with graduated spaces forming, with other spaces or lines on the end of the ferrule, an indicator which will show the pitch of the teeth as filed upon one side of the saw. When completed, a set-screw may be loosened, so as to admit the file being set on the same incline in the opposite direction, previous to filing the teeth set up on the opposite side of the saw. Upon the top of this adjustable ring is provided a disk with radial lines. Through the center of this disk passes a set-screw, its end having a bearing upon the ferrule, so as to confine the adjustable ring at any point desired; also, by means of a jam-nut a suitable guide-rod, which is pivoted upon this set-screw, is held in the position desired to give the front or the cutting edge of the tooth being filed such an angle as may be desirable. To facilitate the cutting of such teeth upon both sides of the saw alike is the object of the adjustable guide-rod. The disk provided with the radial lines is so constructed that the guide-rod may be set at a corresponding angle in either direction.

In using this guide for filing saws, the file is to be pushed across the saw-blade, keeping the guide-rod parallel with the blade, and also level or on the same plane as the ends of the teeth upon the saw. This will insure the teeth when properly set being of the same angles in both directions, which is important in order that the saw may cut smoothly and rapidly.

Figure 1:
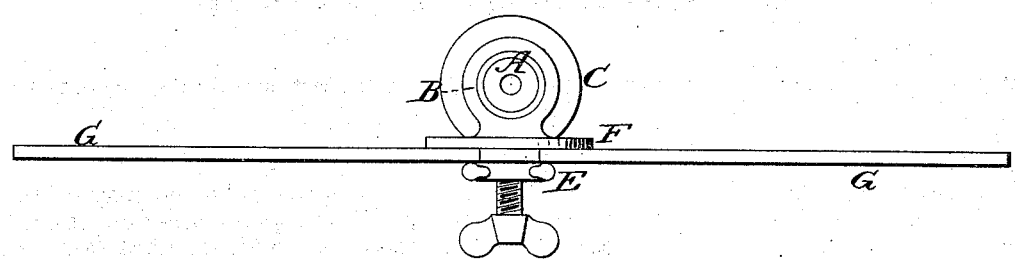
Figure 2:
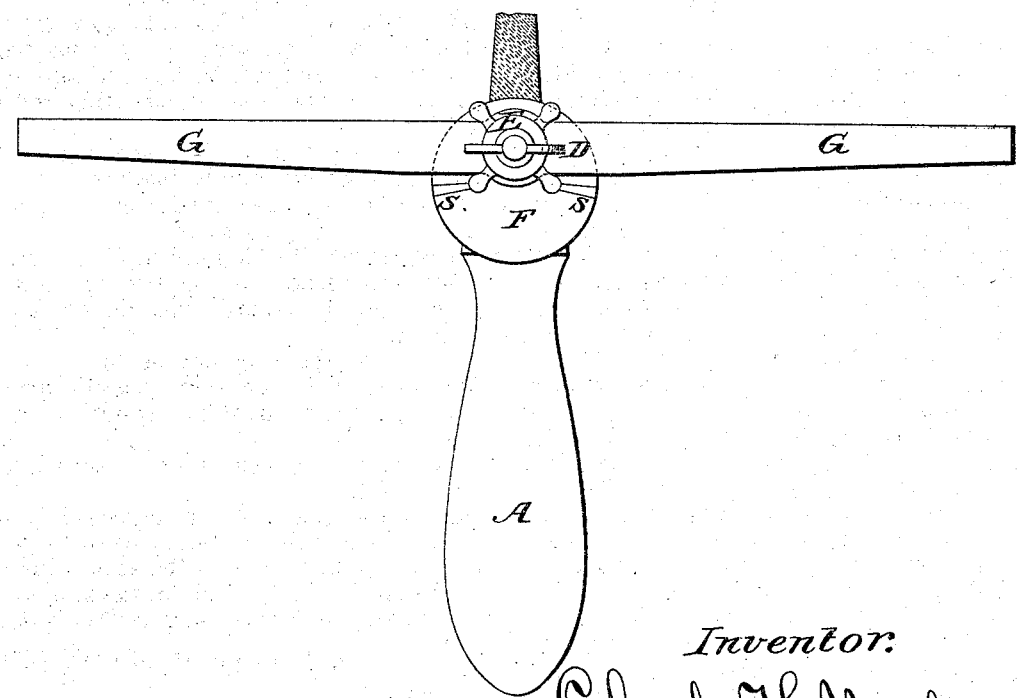

Figure 1 is a plan view, showing the end into which the file is to be inserted. Fig. 2 is a similar view, showing the top with a small portion of a file projecting.

A represents the file-handle; B, the ferrule; C, the adjustable ring; D, the set-screw; E, the jam-nut; F, the disk, with lines $s$; and G, the guide-rod.

The adjustable ring may be held in the position desired by a set-screw passing through it at any other point, or by any desired means of fastening.

Having thus described my invention, what I claim is—

The combination of the adjustable guide-rod G with the file-handle A, arranged to operate in conjunction with the adjustable ring C and disk F, substantially in the manner described, as and for the purposes set forth.

CHARLES H. MATCHETT.

Witnesses:
SYLVENUS WALKER,
JAMES F. MAXWELL.